United States Patent
Wheeler et al.

(10) Patent No.: US 6,910,509 B1
(45) Date of Patent: Jun. 28, 2005

(54) WINDSHIELD WASHER FLUID DISPENSER

(76) Inventors: Loyde A. Wheeler, 1118 N. Howe Rd., Spokane, WA (US) 99212-0917; David A. Wheeler, 1118 N. Howe Rd., Spokane, WA (US) 99212-0917; Cynthia M. Wheeler, 1118 N. Howe Rd., Spokane, WA (US) 99212-0917

( * ) Notice: Subject to any disclaimer, the term of this patent is extended or adjusted under 35 U.S.C. 154(b) by 0 days.

(21) Appl. No.: 10/909,094

(22) Filed: Jul. 30, 2004

(51) Int. Cl.$^7$ .................................................. B65B 1/04
(52) U.S. Cl. ................... 141/2; 141/18; 141/94; 141/198; 222/64; 222/2; 222/74
(58) Field of Search ........................... 141/1, 5, 18, 67, 141/94, 95, 192, 198; 222/64, 2, 74, 75

(56) References Cited

U.S. PATENT DOCUMENTS

| | | | |
|---|---|---|---|
| 4,000,835 A | 1/1977 | Bassett et al. | |
| 5,018,645 A | 5/1991 | Zinsmeyer | |
| 5,088,621 A | 2/1992 | Thompson et al. | |
| 5,497,914 A | 3/1996 | Maltsis | |
| 5,823,402 A | 10/1998 | Moyer et al. | |
| 5,957,329 A | 9/1999 | Kenney et al. | |
| 5,967,366 A | 10/1999 | Cason | |
| 6,112,946 A * | 9/2000 | Bennett et al. | 222/1 |
| 6,311,873 B1 | 11/2001 | Willeke et al. | |
| 6,367,658 B1 | 4/2002 | Kenney et al. | |
| 6,484,907 B1 | 11/2002 | Evans | |
| 6,640,997 B1 | 11/2003 | Anderson | |
| 2002/0130142 A1 | 9/2002 | Wheeler | |

* cited by examiner

*Primary Examiner*—Steven O. Douglas
(74) *Attorney, Agent, or Firm*—Paine Hamblen Coffin Brooke & Miller LLP; Steven M. Bertone (57) ABSTRACT

A windshield washer fluid dispenser apparatus is described for selectively filling a vehicle windshield washer fluid reservoir. In another aspect, a process for refilling a windshield washer fluid dispenser apparatus is also described. As a third aspect, a process for discharging a quantity of windshield washer fluid directly into a vehicle windshield washer fluid reservoir is described.

49 Claims, 6 Drawing Sheets

WINDSHIELD WASHER FLUID DISPENSER

CROSS REFERENCE TO RELATED APPLICATIONS

There are no other applications related to the present application.

BACKGROUND

Vehicles including cars, trucks, motor homes and the like typically have reservoirs and pumps that can be selectively activated to spray windshield washer fluid on the vehicle windshield. Such windshield washer fluid, in conjunction with the vehicle windshield wipers, cleans or otherwise removes undesirable dirt, bugs or other matter from the outer surface of the windshield.

Vehicle windshield washer fluid reservoirs vary in shape and size, but typically will hold a supply of at least a quart of water or windshield washer fluid. The windshield washer fluid supply will diminish with use and the vehicle operator often finds that the fluid has been totally depleted at an inappropriate time.

Under these circumstances an operator usually makes a special trip to a retail outlet where the windshield washer fluid is sold and purchases a one-gallon container of windshield washer fluid. Since the amount of fluid in these containers is typically more than the vehicle windshield washer fluid reservoir will hold, after filling the reservoir the operator will either dispose of the surplus windshield washer fluid or temporarily store the surplus fluid in its open container in the trunk or other storage area of the vehicle. It is not uncommon, given the latter event, that the container works itself open after a period of time, spilling the surplus windshield washer fluid in the vehicle.

At a later date, when the supply of windshield washer fluid in the vehicle windshield washer fluid reservoir is again depleted, the vehicle user must then either use the surplus fluid from the previous purchase (if available) or buy more windshield washer fluid. In the former event, there may not be enough surplus fluid to fill the vehicle windshield washer fluid reservoir a second time. In the latter event, the user is now saddled with two containers.

It is unusual that a full windshield washer fluid reservoir will become fully depleted between vehicle fuel fillings. Thus, if the vehicle operator had access to windshield washer fluid each time the vehicle refueled, the vehicle windshield washer fluid reservoir would not likely become depleted at an inappropriate time.

A need has therefore been evidenced for a windshield washer fluid dispenser that can be associated with a fuel filling station or other convenient location where a vehicle is regularly maintained or kept. The present invention fills this need, as will be understood from the following description and accompanying drawings.

SUMMARY

In one aspect, the present invention provides for an apparatus to dispense windshield washer fluid. The apparatus generally comprises a base housing, a means to access an interior space of the base housing, a power source capable of rendering electric current to operate the apparatus, a fluid container within the interior space capable of containing a supply of windshield washer fluid, an intake line, a discharge line, a fluid pump assembly configurable to refill the contents of the fluid container or discharge the contents of the fluid container and a means for authorizing use of the windshield washer fluid dispenser. In a preferred embodiment of the apparatus, the apparatus further comprises a display cap with display surfaces, a totalizer and a coin counter.

In another aspect, the present invention provides a process of replenishing or refilling the windshield washer fluid dispenser. The process generally comprises providing a windshield washer fluid dispenser, gaining access to the windshield washer fluid dispenser, acquiring the intake line and configuring the apparatus such that a quantity of fluid is transferred from an external bulk container to a fluid container within the windshield washer fluid dispenser.

In yet another aspect, the present invention provides a process to dispense windshield washer fluid from the windshield washer fluid dispenser. The process namely comprises providing a windshield washer fluid dispenser and a vehicle windshield washer fluid reservoir, obtaining authorization to use the windshield washer fluid dispenser, extending the discharge line to the vehicle windshield washer fluid reservoir and thereby permitting flow of the windshield washer fluid from the windshield washer fluid dispenser into the vehicle windshield washer fluid reservoir.

Other embodiments, and other features and objects of the present invention will be in part apparent to those skilled in the art and in part pointed out hereinafter.

BRIEF DESCRIPTION OF THE DRAWINGS

A more complete appreciation of the present invention may be readily obtained by reference to the following descriptions when considered in connection with the accompanying drawings, wherein.

DESCRIPTION OF PREFERRED EMBODIMENTS

This disclosure of the present invention is submitted in furtherance of the constitutional purposes of the U.S. Patent Laws "to promote the progress of science and useful arts" (Article 1, Section 8). Before relating specific details of preferred elements of the invention, general statements describing preferred aspects of the invention will be given. Headers and cross-references appearing within the following paragraphs are intended for the convenience of the reader and should not be interpreted to restrict the scope of the discussion presented at any respective location.

GENERAL DESCRIPTION

Figures 6A, 6B:
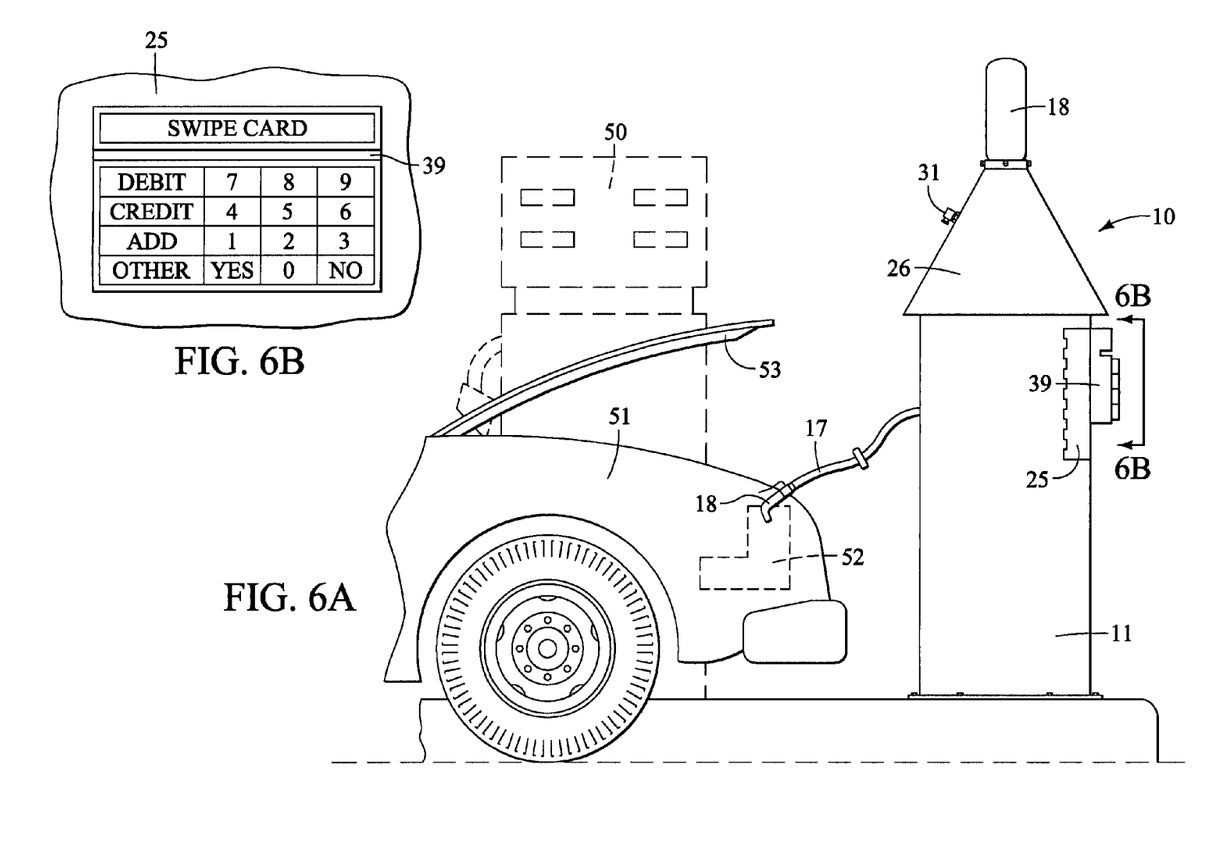
FIG. 6 is a schematic view illustrating an embodiment of a windshield washer fluid dispenser configured to discharge windshield washer fluid into a vehicle windshield washer fluid reservoir.

A first aspect of the invention includes a windshield washer fluid dispenser 10 (FIGS. 1–4, 6) for selectively filling a vehicle windshield washer fluid reservoir 52 (FIG. 6). Embodiments of the windshield washer fluid dispenser 10 provide a base housing 11 that define an interior space 12, thereby protecting internal structures and components of the windshield washer fluid dispenser 10. A fluid container 13 is situated or otherwise disposed within the interior space 12, thereby capable of containing a supply of windshield washer fluid 14.

The windshield washer fluid dispenser 10 further comprises a fluid pump assembly 15 disposed within its interior space 12, thereby selectively providing a means of refilling the fluid container 13 through an intake line 16 and providing a means of discharging the contents of the fluid container 13 through a discharge line 17.

The intake line 16 is typically of sufficient length to extend from the fluid pump assembly 15 to an external bulk container 60 containing bulk windshield washer fluid or other appropriate fluids. During the refilling process, one end of the intake line 16 environmentally communicates with the fluid pump assembly 15 while the other end of the intake line 16 is selectively received within the external bulk container 60 (see FIG. 4a). During the discharge process, the intake line 16 is typically coiled within the interior space 12 of the apparatus (see FIG. 3a).

The discharge line 17 is typically of sufficient length to extend from the fluid pump assembly 15 to the vehicle windshield washer fluid reservoir 52. One end of the discharge line 17 environmentally communicates with the fluid pump assembly 15 while the other end of the discharge line 17 terminates at a discharge end. Adjacent to or at the discharge end, a discharge line 17 will typically have a discharge valve 18 allowing a customer to selectively allow or disallow fluid to be discharged through the discharge line 17.

Typically, the fluid pump assembly 15 is further comprised of a pump 19, an input valve 20, a first container line 21, an output valve 22 and a second container line 23. Specific configurations of the input valve 20 and the output valve 22, as discussed in further detail in the following paragraphs, allows the apparatus to be selectively configured to refill the fluid container 13 with fluid through the intake line 16 or alternatively configured to discharge the supply of windshield washer fluid 14 through the discharge line 17 to a vehicle windshield washer fluid reservoir 52.

A control panel 24 is further disposed within the interior space 12 of the apparatus, serving a number of functions, including: routing power to various components of the apparatus, controlling the pump 19 and providing visual indications of the status of the apparatus.

Second and third aspects of the invention involve processes to refill the fluid container 13 and discharge windshield washer fluid into a vehicle windshield washer fluid reservoir 52, respectively. These processes shall be further described subsequent to a more detailed discussion of the apparatus.

DETAILED DESCRIPTION OF THE APPARATUS

The base housing 11 is illustrated (FIGS. 1–4, 6) as substantially circular and hollow to enclose the fluid container 13, pump assembly and at least portions of a control panel 24. The base housing 11 could also be oval, rectangular, rectilinear or other shapes without departing from the scope of the invention. Preferably, the base housing 11 is constructed of an appropriate sheet metal such as 16 gauge cold rolled steel that is cut with a plasma cutting device to resemble an antique fueling device. Alternatively, materials commonly used in construction of modern automotive refueling stations 50 housings can be used. In this regard, any rigid material and enclosure which is resistant to hydrocarbon fuels could be employed.

In order to install, maintain and refill the apparatus, an access door 25 providing access to the interior space 12 of the apparatus is typically fabricated in conjunction with the base housing 11. Typically, the access door 25 is attached to the base housing 11 by a continuous piano-type hinge or other secure hinge/swivel means. Opposite the piano hinge, typically a locking clasp or other securing device is provided on the access door 25 to selectively secure the access door 25 to the base housing 11 and restrict access to the interior space 12 of the apparatus.

In an embodiment of the invention illustrated in FIGS. 1–4 and 6, a roof 26 in the approximate shape of a cone is provided on the base housing 11. In alternate embodiments of the present invention, the roof 26 may be of flat, pitched, rounded or of other shape suitable for the desired appearance or additional functions served by roof 26.

Figure 1:
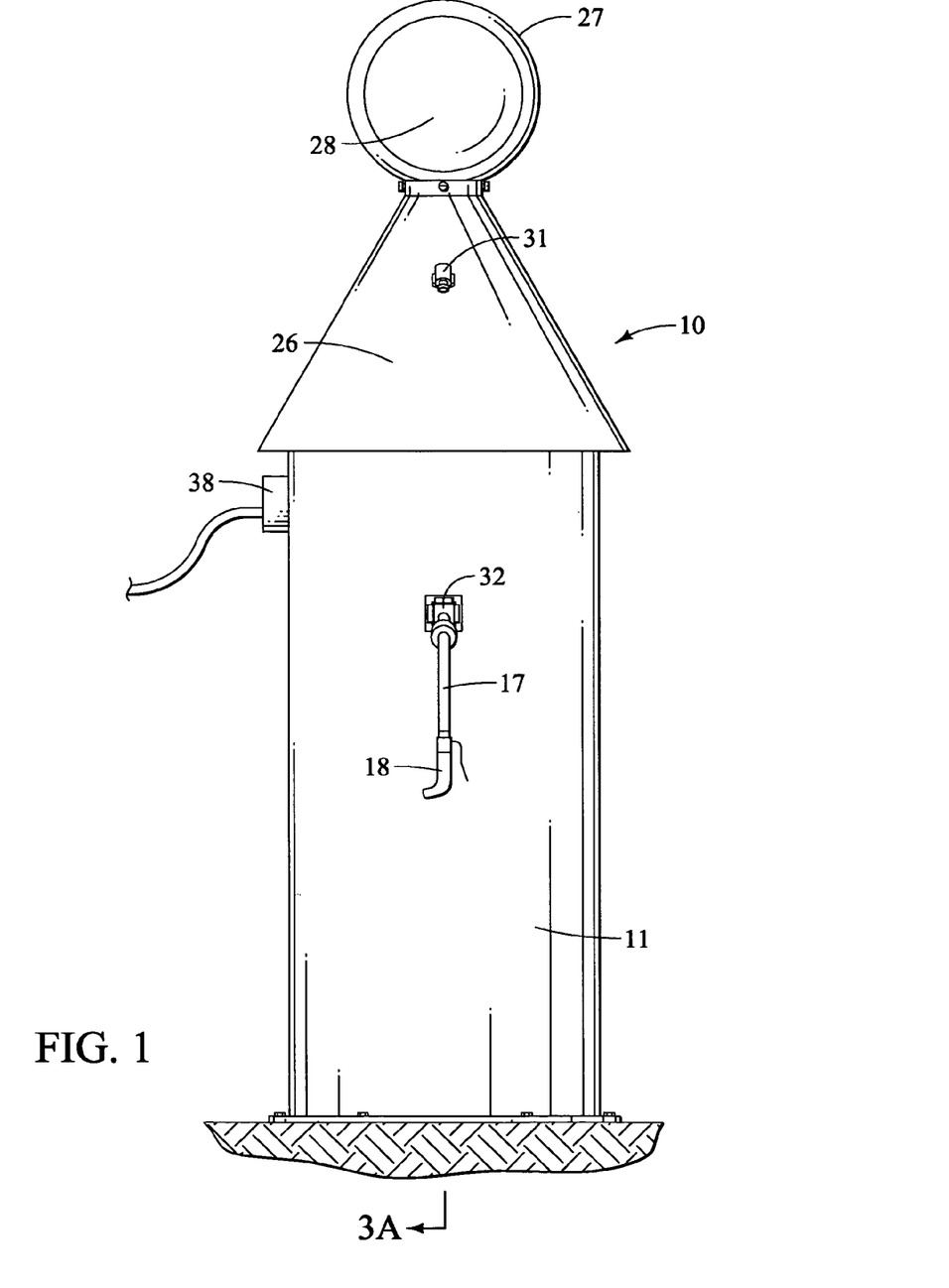
FIG. 1 is a frontal view of an embodiment of a windshield washer fluid dispenser.
Figure 2:
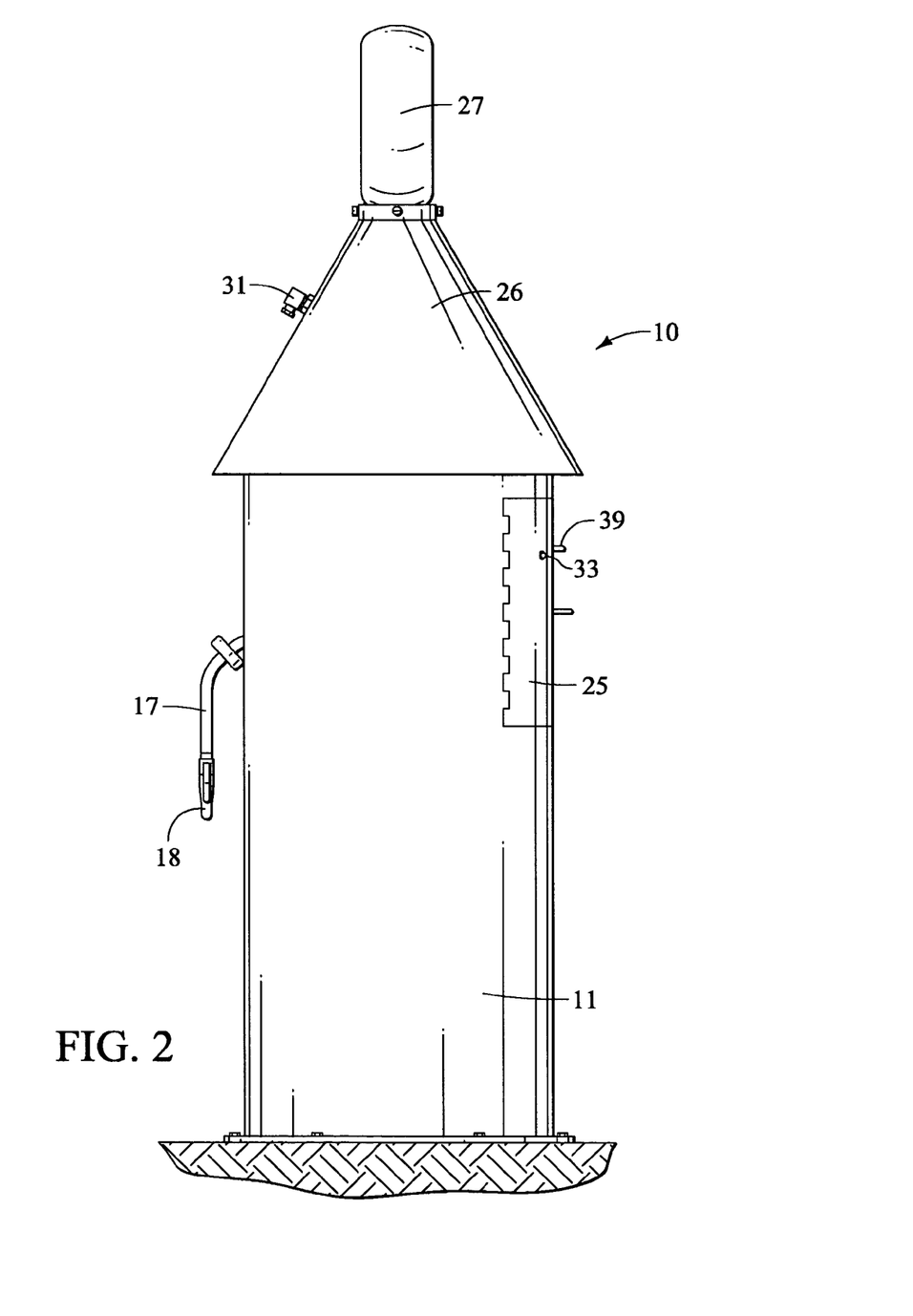
FIG. 2 is a side view of an embodiment of a windshield washer fluid dispenser.
Figures 3A, 3B, 3C, 3D:
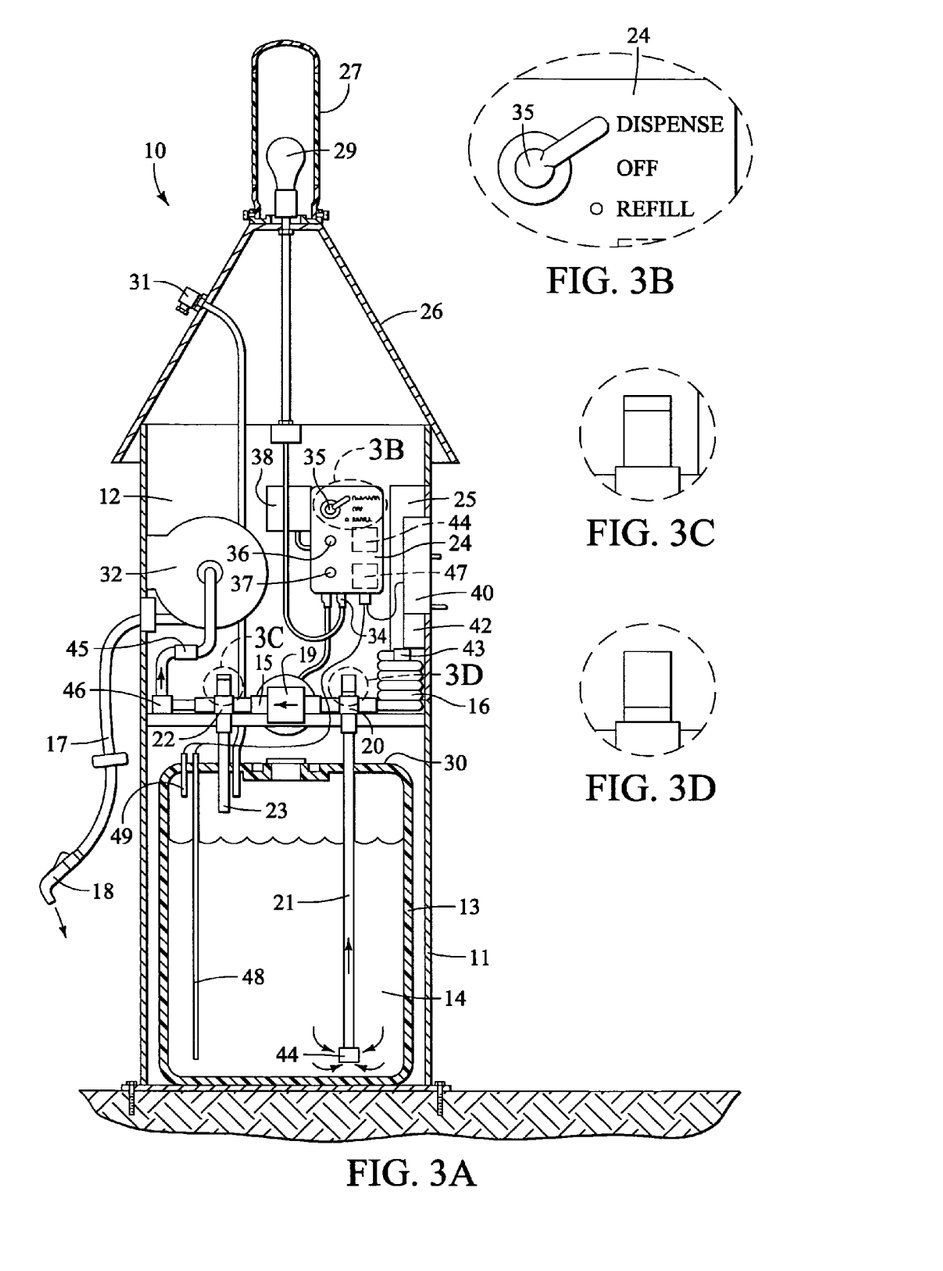
FIG. 3a is the cross sectional view of an embodiment similar to FIG. 2, configured for the discharging process.
FIG. 3b is the enlarged view of the configuration of the pump switch depicted in FIG. 3a, wherein the pump switch is configured for the discharging process.
FIG. 3c is the enlarged view of the configuration of the output valve depicted in FIG. 3a, wherein the output valve is configured for the discharging process.
FIG. 3d is the enlarged view of the configuration of the input valve depicted in FIG. 3a, wherein the input valve is configured for the discharging process.

A display cap 27 or other decorative device can be provided on the exterior of the base housing 11, as illustrated in FIGS. 1 and 6. As desired, the display cap 27 can provide one or more display surfaces 28. The illustrated shape of the display cap 27 in FIGS. 1 and 6 are circular and comprise two display surfaces 28, but other shapes may be used with equal success. If the display cap 27 comprises two or more display surfaces 28, the display surfaces 28 content may be similar or dissimilar. For example, the display surfaces 28 can provide content identifying the contents of the fluid container 13, promoting the fuel station logo, or otherwise increasing the appeal of the windshield washer fluid dispenser 10 to prospective customers. The display cap 27 and display surfaces 28 thus provide a significant added advantage of visually displaying and promoting sale of the windshield washer fluid, especially when the apparatus is placed in a location which is adjacent to automotive refueling station 50.

Optionally, a light source 29 can be positioned on or behind the display surfaces 28 for back lighting purposes. Typically, the light source 29 derives its electric power from the control panel 24, although in certain installations it is desirable to provide a light source 29 capable of independent operation via battery power, solar energy, fuel cell or other power sources.

The fluid container 13 is preferably a separate element from the base housing 11, although it could be made integral with the base housing 11 walls. The preferred fluid container 13 rests or is enclosed within the bottom portion of the base housing 11, and is formed of an appropriate plastic or other chemically resistant material that is complementary to the cross-sectional shape of the base housing 11. The fluid container 13 should be designed to hold a large volume of windshield washer fluid (approximately 30–50 gallons) to service a large number of vehicles before requiring refilling or replacement with a full replacement fluid container. A preferred fluid container 13 shown to be effective is a standard 55-gallon polyethylene barrel.

A top surface 30 of the fluid container 13 should provide openings for the intake line 16, the first container line 21, the second container line 23 and a vent line 31, as well as an access bung if direct refilling (discussed below) is desired. The vent line 31 provides pressure equalization for the fluid container 13 while refilling the fluid container 13 or while discharging fluid from the fluid container 13. The vent line 31 also provides pressure equalization of the fluid container 13 on the occasion that the apparatus is subjected to significant changes in environmental or thermal conditions.

While standard windshield washer fluid is typically capable of remaining in a liquid state in cold climates, in extremely cold climates it may become desirable to install a heater within the fluid container 13 to prevent the supply of windshield washer fluid 14 from freezing.

The pump 19 typically configured in the fluid pump assembly 15 is a conventional electric pump 19 that is mounted within the base housing 11. Preferred results have been achieved by using a standard, flexible impeller, 115 VAC, 15 PSI, 4.5 gallon per minute pump 19.

The input valve 20 and the output valve 22 are standard brass 3-way valves, utilizing standard plumbing components to provide a sealed environmental communication to the pump 19 and related lines (such as intake line 16, first container line 21, discharge line 17 and second container line 23).

A hose length of approximately 15 feet is sufficient to serve as a discharge line 17 at an automotive refueling station 50, though other lengths may be used with equal success. Installations in other locations, for example, at a car wash or automotive parts retailer may dictate other hose lengths.

If desired, a discharge line reel 32 can be mounted inside the interior space 12, thereby allowing an customer to extend the discharge line 17 to a desired distance or length. When the customer is finished with the discharge line 17 and desires to return the discharge line 17 to the apparatus to its original configuration, the customer gently tugs the discharge line 17, thereby engaging a spring within the discharge line reel 32 which substantially retracts the discharge line 17 onto a spool of the discharge line reel 32 and thereby into the interior space 12 of the apparatus.

A conventional-type nozzle is typically provided as a discharge valve 18 at the discharge end of the discharge line 17. The nozzle can be any number of nozzles commercially available, as a manually operable or automatically operable. For example, such an automatic nozzle may include a conventional pressure sensor that will automatically disallow the flow of windshield washer fluid through the discharge valve 18 upon sensing that the vehicle windshield washer fluid reservoir 52 is full.

Two float switches, a tank empty float switch 48 and a tank full float switch 49, are typically configured within the fluid container 13, rendering information to the electronic circuitry of the apparatus as to the level of windshield washer fluid present in the fluid container 13.

A tank empty indicator 33, typically comprised of a conventional light bulb, is configured to illuminate on the access door 25 or otherwise alert a prospective customer when the tank empty float switch 48 reaches a specific level near the bottom of the fluid container 13. In embodiments developed for a vending or retail environment, it is advantageous to configure the fluid pump assembly 15 to become disabled when the tank empty float switch 48 closes and the tank empty indicator 33 is lighted.

A tank full indicator 37, comprised of a conventional light bulb similar to the tank empty indicator 33, is also typically configured to illuminate or otherwise alert an owner when the tank full float switch 49 reaches a certain level near the top of the fluid container 13 during the refilling process.

The control panel 24 typically comprises one or more power outlets 34, a pump switch 35, the power indicator 36 and the tank full indicator 37.

The pump switch 35 comprises a 3-way electrical switch configured to selectively energize the pump 19 for: (i) the refilling process, (ii) the discharging process or (iii) disabling the apparatus, (see FIGS. 3b, 4b and 5.) In an "OFF" position, the switch prohibits any power from reaching the pump 19. During normal operation, the pump switch 35 remains in a "DISPENSE" position, thereby only energizing the pump 19 through the timer 41, (see FIG. 5). During a refilling process wherein the fluid pump assembly 15 is to be utilized, the switch will be selectively configured to a "REFILL" position thereby energizing the pump 19, (see FIG. 5).

The power indicator 36 on the control panel 24 confirms that the apparatus is receiving electrical current from a power source 38, which may be either external or internal. Preferably, electrical circuits within the apparatus are configured for utilization of 110 volt alternating current readily available in North America, although the apparatus could be alternatively configured for other electrical power voltages or configurations encountered abroad. In yet other embodiments of the present invention, the apparatus could be configured to operate from batteries, solar power, fuel cells or a combination of these and other conventional energy sources rendering electric current.

Figure 5:
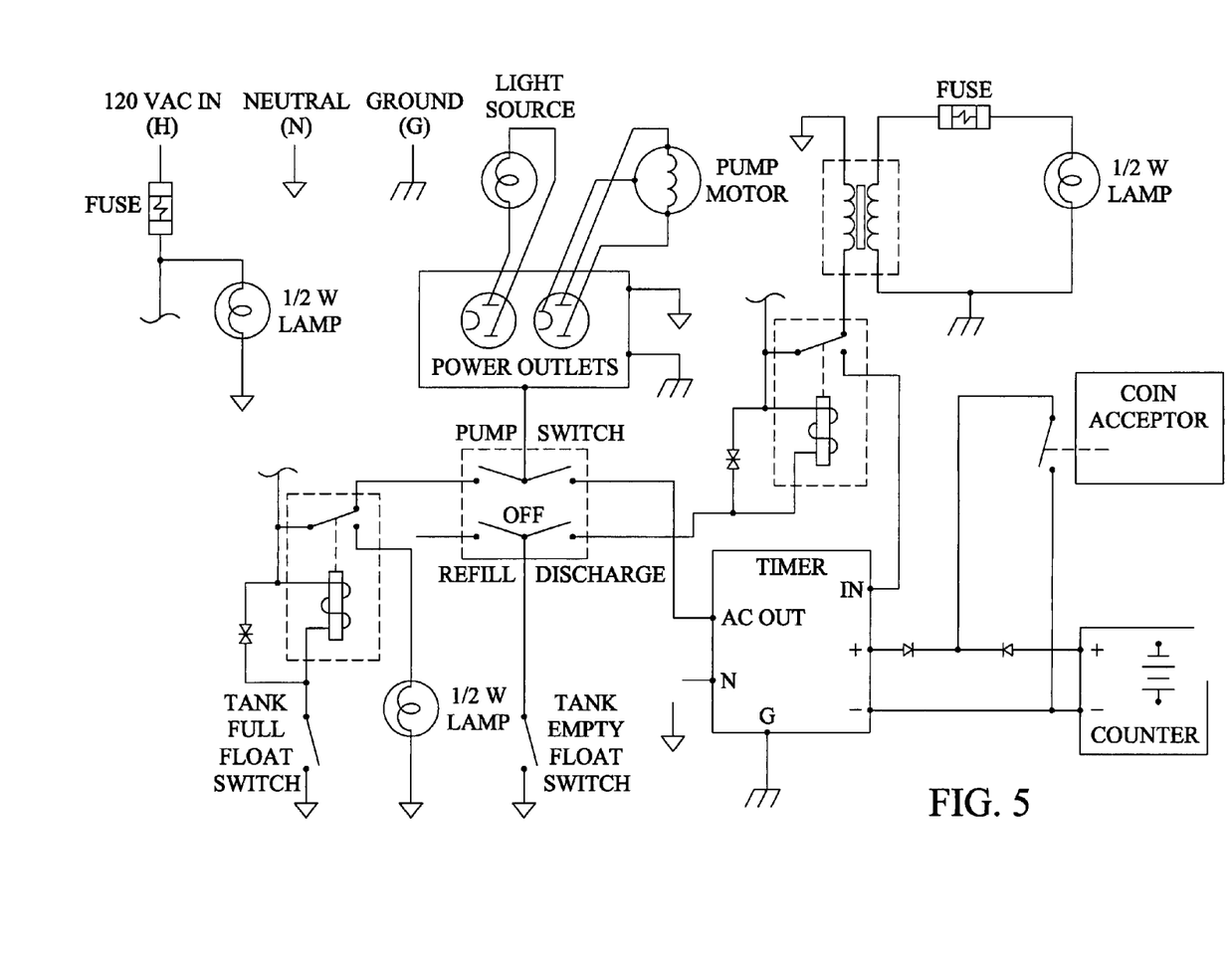
FIG. 5 is a schematic view of electronic circuitry of an embodiment of a windshield washer fluid dispenser.

Fuses or circuit breakers, as more particularly illustrated in FIG. 5, should be installed within the electronic circuitry of the apparatus to meet regulations and provide safety and resistance to power surges, electrical overloads and failures that may occur in electrical components, as well as other unexpected electrical anomalies.

In order for the windshield washer fluid dispenser 10 to restrict use to certain authorized customers, the apparatus should include a means of authorizing use 39. The means of authorizing use 39, in various embodiments, can be based upon a diversity of specific conditions that must be satisfied before rights of usage are granted—such as the status of rendering payment, successful manipulation of a lock, identification of the customer, time of day/week, or other desired conditions.

In a preferred embodiment, the means of authorizing use 39 is comprised of a coin acceptor 40 mounted on the inside of the access door 25 and a timer 41 mounted inside the control panel 24. The coin acceptor 40 is a standard "cherry lever" coin accepter, typically accepting only quarters and discharging both coins below the coin acceptor 40. To catch the falling coins, the coin acceptor 40 preferably has a coin box 42 which is mounted below the coin acceptor 40. Typically, a metal box 3"×3"×6" has been found suitable for capturing and holding a quantity of coins until the apparatus is serviced or a refilling process is required. It is advantageous to make such a coin box 42 removable, such that an owner is capable of dumping the contents into a larger coin collection bag.

The timer 41 is typically mounted in the control panel 24 for protection from the supply of windshield washer fluid 14, humidity and other undesirable elements that may cause the timer 41 to fail.

In the preferred embodiment, when quarters are deposited into the coin acceptor 40, each quarter trips a small switch which sends an electrical pulse to the timer 41. The electrical pulses, based on the configuration of the timer 41, invoke the timer 41 to energize the pump 19 for a specified period of time. The specified period of time that the machine will stay operative depends on the number of quarters that were deposited by the customer and the configuration of the timer 41. When the time configured by the timer 41 runs out, the circuit providing power to the pump 19 through the timer 41 is opened and thus power is cut-off.

In alternate embodiments, the timer 41 can also be configured to only energize the pump 19 only during certain periods of the day, certain days of the week, or other various conditions as desired by the owner.

In yet another embodiment, operation of the present system could be integrated with conventional card scanner or retail transaction systems that are currently in use at fueling stations. Such a credit card transaction alleviates the need for depositing currency or coins as described above. As desired by the owner, embodiments of the present apparatus could also be configured to integrate with a centralized retail or transaction system at an automotive refueling station 50.

FIG. 6 shows, in schematic form, an alternate preferred installation for the apparatus located next to a conventional automobile refueling station 50, illustrating how a conventional credit card scanner is utilized as a means of authorizing use 39.

In vending and retail embodiments, it is advantageous that the windshield washer fluid flow through the discharge line 17 at a desired and consistent flow rate. As the pump 19 typically provides a flow rate in excess of that necessary to provide to a customer, embodiments of the apparatus are typically configured with an appropriate flow restrictor 45 (FIG. 3a) to restrict the flow of windshield washer fluid through the discharge line 17 at a specific maximum flow rate. Typically, it has been demonstrated that a flow restrictor 45 restricting the flow of windshield washer fluid to 1.5 gallons per minute is sufficient for use in installations at automotive refueling stations 50, though this rate could be greater or lesser depending upon the embodiment and application of the present invention.

Likewise, in vending or retail embodiments, it is also advantageous to provide a means for the owner to audit: (i) the total volume of windshield washer fluid discharged and (ii) the total amount of currency received by the apparatus.

To solve the former task, a totalizer 46 should be installed in environmental communication with the discharge line 17 at any convenient location between the discharge line 17 and the output valve 22, thereby requiring that any windshield washer fluid to be dispensed through the discharge line 17 must first pass through the totalizer 46. The totalizer 46 is typically a standard fluid volume metering device that cannot be reset, though in various installations it is advantageous to provide a significantly more sophisticated totalizer 46 capable of rendering additional information regarding the discharge of fluid from the apparatus.

To solve the latter task of monitoring the total amount of physical currency received by the windshield washer fluid dispenser 10, it is recommended that a coin counter 47 be installed in the apparatus. The coin counter 47 is typically a standard counting device linked to the means of authorizing use 39, (or coin acceptor 40, if installed), that perpetually counts the currency deposited to the machine. Like the totalizer 46, the coin counter 47 cannot be reset. Given the benefit of information provided by the totalizer 46 and the coin counter 47, an owner possesses the capability of reconciling the volume of windshield washer fluid discharged with the currency deposited, thereby discouraging misuse of the apparatus or undisclosed theft of revenues generated by the apparatus.

In yet another embodiment, the apparatus could be configured to operate without payment or calculations, but instead require that a customer possess or present certain credentials or identification, (such as a key, an ID card, passcode or other form of identification). Such embodiments are desirable in installations where there is no need to collect charges for the windshield washer fluid. Private garages or commercial fleet owners could make use of such embodiments. Other commercially available devices providing automated means of verifying or rejecting identification include magnetic card readers, optical card readers, handprint/fingerprint scanners, eye/retina scanners, facial recognition devices, mobile phone signal receivers, infrared signature scanners or other advanced technology means can be utilized as a means of authorizing use in the present apparatus, as desired.

When commercializing an embodiment of the disclosed apparatus, the embodiment should be tested and certified by Underwriters Laboratory (UL) or a similar independent laboratory for environmental conditions and safety. Such independent laboratories would typically test the embodiment of the present invention for vulnerabilities due to exposure to various environmental elements, heat, ground continuity, shock, flammability, etc.

As the flashpoint on standard windshield washer fluids is typically low, (less than 100 degrees Fahrenheit), standard windshield washer fluids are characterized as a "flammable" liquid. As an automotive refueling station 50 is not an optimal location to handle or dispense flammable windshield washer fluid, it is advantageous to take precautions necessary to minimize the additional risks posed by installation of a windshield washer fluid dispenser. In this regard, the present apparatus is intended, though not necessarily required, to be utilized with windshield washer fluid that has a flashpoint above 100 degrees Fahrenheit. The increased flashpoint of the supply of windshield washer fluid 14 decreases the risk of flammability of the apparatus or its contents while continuing to serve its intended purposes.

If the windshield washer fluid utilized in the present apparatus has a flashpoint exceeding 100 degrees, the preferred embodiment as disclosed above conforms to UL Safety Standard 751, distinguishing the present windshield washer apparatus, (notwithstanding other distinguishing features as disclosed herein), from all other windshield washer fluid dispensers presently available. Since the windshield washer fluid developed for the preferred embodiment of the present invention has a higher flashpoint than that of ordinary retail windshield washer fluid, windshield washer fluid dispensers and vehicles that are filled with the new and improved windshield washer fluid as disclosed by the present invention are safer than apparatuses and vehicles that are filled with standard windshield washer fluids.

DETAILED DESCRIPTION OF THE REFILLING PROCESS

After installation of the apparatus, and from time to time, it is necessary to refill the fluid container 13 with a supply of windshield washer fluid 14. As described above, it is advantageous to replenish the fluid container 13 with fluid having a flashpoint in excess of one hundred degrees Fahrenheit. There are two principal methods to refill the fluid dispenser, namely pouring fluids directly into the fluid container 13 or alternatively pumping fluids into the fluid container 13 via the intake line 16 and the fluid pump assembly 15.

In order to refill the fluid container 13 by either method, an owner must first open the access door 25 of the base housing 11 to gain access to the interior space 12 of the apparatus.

To directly fill the fluid container 13 by the former method, the fluid container 13 must provide an access bung (or other access means) to allow the direct transfer of fluid into the fluid container 13. If such an access bung is available, the method of refilling the fluid container 13 by direct transfer is rather straight-forward. By example, the owner would transfer windshield washer fluid into the reasonably empty fluid container 13 by conventional means of pouring, pouring through a funnel, siphon, gravity feed, etc. Alternatively, if water is to be used as a windshield washer fluid, the owner fills the apparatus by directing water from a conventional water hose connected to a faucet into the fluid container 13.

The second method of refilling the fluid container 13 provides that windshield washer fluid or other fluids are pumped into the fluid container 13. After opening the access door 25 of the base housing 11, the owner acquires the intake line 16, and confirms or otherwise connects one end of the intake line 16 to the input valve 20, (as necessary). The owner then places the free end of the intake line 16 into an external bulk container 60 containing the desired fluid to be transferred.

Figures 4A, 4B, 4C, 4D:
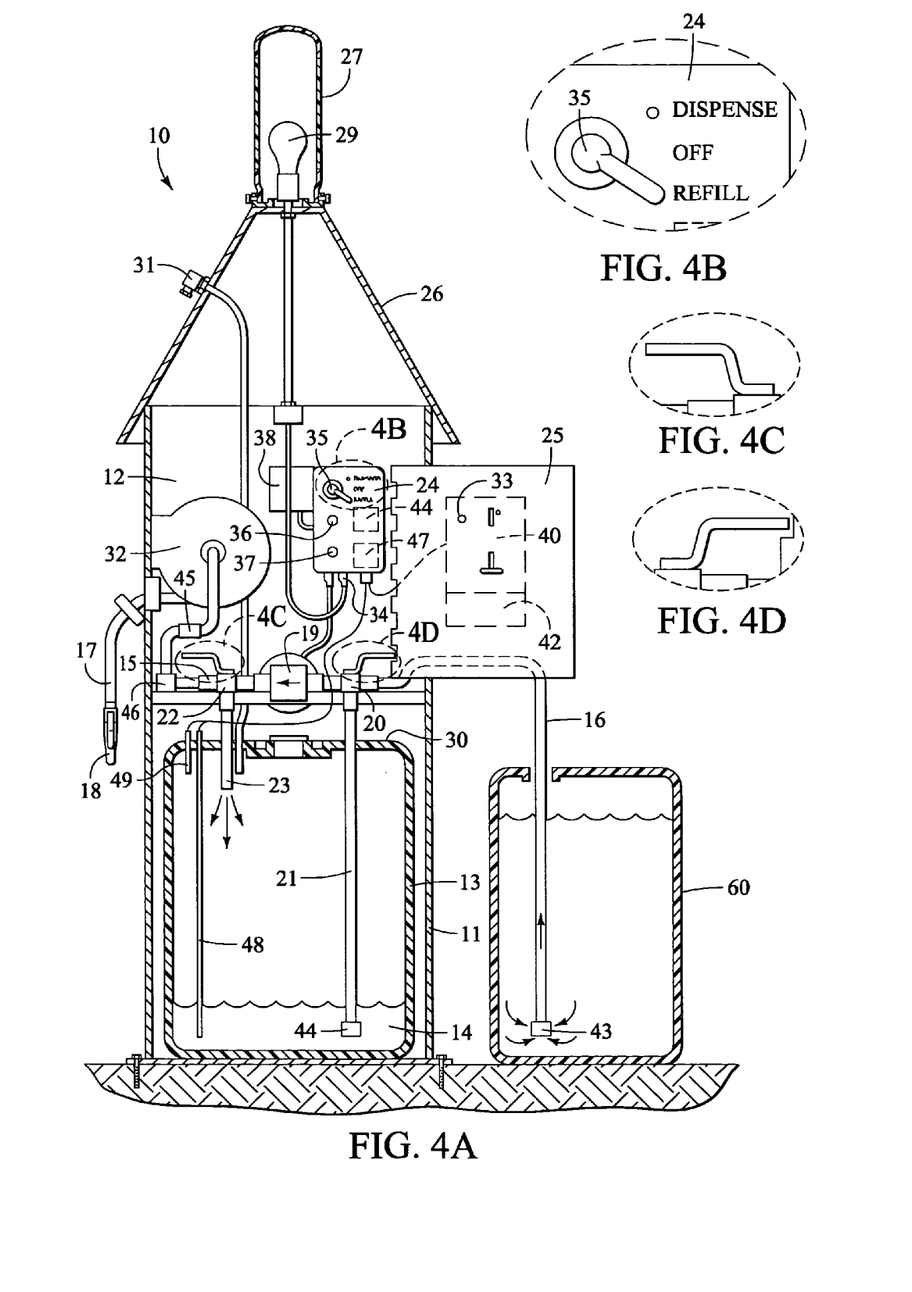
FIG. 4a is the cross sectional view of an embodiment similar to FIG. 2, configured for the refilling process.
FIG. 4b is the enlarged view of the configuration of the pump switch depicted in FIG. 4a, wherein the pump switch is configured for the refilling process.
FIG. 4c is the enlarged view of the configuration of the output valve depicted in FIG. 4a, wherein the output valve is configured for the refilling process.
FIG. 4d is the enlarged view of the configuration of the input valve depicted in FIG. 3a, wherein the input valve is configured for the refilling process.

Next, both the input valve 20 and the output valve 22 are configured to respective "REFILL" positions, (see FIGS. 4a, 4c, 4d). On the input valve 20, the "REFILL" position provides that the input valve 20 provides an environmental communication for fluid between the intake line 16 and the pump 19, thereby accepting incoming fluid from the intake line 16 (and not the first container line 21) and directing the fluid to the pump 19. In the "REFILL" position, the output valve 22 provides a communication for fluid between the pump 19 and the second container line 23, thereby accepting fluid from the pump 19 and directing the fluid to the second container line 23 (and not the discharge line 17).

Having configured the input valve 20 and output valve 22 in their respective "REFILL" positions, the owner then switches the pump switch 35 to its "REFILL" position (see FIGS. 4a, 4b) thereby energizing the pump 19. Fluid thereby travels from the external bulk container 60 through the intake line 16 and through a intake line check valve 43 configured either on the intake line 16 or the input valve 20, (see FIG. 4a). The intake line check valve 43 prevents accidental leakage of fluid properly contained in the fluid container 13 from leaking by siphon or other inadvertent means. The fluid then travels into and through the first input valve 20, properly configured to direct the fluid to the pump 19. After traveling through the pump 19 the fluid travels through the output valve 22, properly configured to direct the fluid into the second container line 23 and the fluid container 13.

Based on tests performed by the inventors, transferring a typical desired volume of 40–50 gallons of fluid will take 10–15 minutes to complete. Following the transfer of a desired volume of fluid into the fluid container 13, the owner switches the pump switch 35 to its "DISPENSE" position (see FIGS. 3a, 3b). The intake hose is subsequently removed from the external bulk container 60 (and disconnected from the fluid pump assembly 15, if desired), and stowed inside the base housing 11 (or stored in an alternate convenient location).

By either of the above described methods, the owner then secures the access door 25 and the refilling process is complete. Properly configured, the apparatus can now be utilized to discharge the supply of windshield washer fluid 14, which shall now be discussed in further detail.

DETAILED DESCRIPTION OF THE DISCHARGING PROCESS

In a typical scenario of discharging windshield washer fluid with an embodiment of the apparatus, a customer drives a vehicle 51 to an automotive refueling station 50 to refuel. After commencing the refueling process, the customer typically has extra time to spend, opening a hood 53 of the automobile and checking various fluid levels. One such task is checking, and refilling if necessary, the level of the windshield washer fluid in the vehicle windshield washer fluid reservoir 52.

Once the customer determines that there is a need for additional windshield washer fluid to transfer into the vehicle windshield washer fluid reservoir 52, the customer approaches the windshield washer fluid dispenser 10.

While a variety of means of authorizing use 39 are implemented in various embodiments of the apparatus, typically the customer inserts coins into the apparatus. The means of authorizing use 39 thereby energizes the fluid pump assembly 15 for a specified period of time, whereby the customer may refill the vehicle windshield washer fluid reservoir 52 through the discharge line 17. More particularly, the customer acquires the discharge line 17 and places a portion of the discharge nozzle above or within the vehicle windshield washer fluid reservoir 52. The customer selectively engages the discharge valve 18 to permit windshield washer fluid to flow through the discharge line 17 into the vehicle windshield washer fluid reservoir 52.

More particularly, a quantity of the supply of windshield washer fluid 14 will travel from the fluid container 13, through a container line check valve 44, through the first container line 21 and through the input valve 20 into the pump 19. Exhausted through the output side of the pump 19, the fluid will then travel through the output valve 22, through the totalizer 46 and into and through the flow restrictor 45. After the fluid passes through the flow restrictor 45, it travels into and through the discharge line 17, selectively discharged through the discharge valve 18 at the discharge end—into the vehicle windshield washer fluid reservoir 52.

When a desired volume of the supply of windshield washer fluid 14 has been discharged into the vehicle windshield washer fluid reservoir 52, the customer returns the discharge line 17 to its original configuration at the windshield washer fluid dispenser 10 and secures the hood 53 of the vehicle 51.

In any of the operational situations described above, and equivalents thereof, the apparatus and discharge process described are advantageous for the customer in that the amount of windshield washer fluid rendered is the exact amount desired to fill the vehicle windshield washer fluid reservoir 52, obviating the need to dispose, store or transport excess windshield washer fluid. Further, if the apparatus is installed at an automotive refueling station 50, the customer may tend to filling his/her vehicle windshield washer fluid reservoir 52 while waiting for the process of refueling to complete, circumventing the need effect an additional retail transaction for the purchase of a traditional bottle of windshield washer fluid at a retail counter.

The disclosed embodiments of the present invention derive significant benefits that have not been exhibited by other fluid dispensers publicly disclosed to date, including but not limited to ease of manufacture, reliability, convenience, auditing capabilities and safety of the present invention.

Numerous modifications and variations of the present invention are possible in light of the above teachings. In compliance with the statute, the invention has been described in language more or less specific as to structural and methodical features. Therefore, it is further understood that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A windshield washer fluid dispenser for selectively filling a vehicle windshield washer fluid reservoir, comprising:
   a base housing with an interior space defined by the base housing;
   a roof disposed on the base housing;
   a means to access the interior space of the base housing;
   a power source capable of rendering electric current to operate the apparatus;
   a fluid container within the interior space, the fluid container capable of containing a supply of windshield washer fluid;
   an intake line environmentally communicating with an input valve;
   a discharge line environmentally communicating with an output valve leading to a discharge end thereof, the discharge line being of sufficient length to extend from the windshield washer fluid dispenser to the vehicle windshield washer fluid reservoir;
   a discharge valve in the discharge line adjacent to the discharge end, the discharge valve being selectively operable between an open discharge condition and a closed retention condition;
   a first container line environmentally communicating with the input valve and the fluid container;
   a second container line environmentally communicating with the output valve and the fluid container;
   a fluid pump assembly, configurable to refill the contents of the fluid container or discharge the contents of the fluid container, further comprising the input valve, the first container line, the output valve, the second container line and a pump, wherein the pump environmentally communicates with the input valve and the output valve; and
   a means for authorizing use of the windshield washer fluid dispenser.

2. The windshield washer fluid dispenser for selectively filling a vehicle windshield washer fluid reservoir as defined by claim 1, wherein the fluid container is removable from the base housing.

3. The windshield washer fluid dispenser for selectively filling a vehicle windshield washer fluid reservoir as defined by claim 1, further comprising a supply of windshield washer fluid contained within the fluid container.

4. The windshield washer fluid dispenser for selectively filling a vehicle windshield washer fluid reservoir as defined by claim 1, further comprising a supply of windshield washer fluid contained within the fluid container having a flashpoint in excess of one hundred degrees Fahrenheit.

5. The windshield washer fluid dispenser for selectively filling a vehicle windshield washer fluid reservoir as defined by claim 1, wherein the means for authorizing use comprises a device accepting coins or bills.

6. The windshield washer fluid dispenser for selectively filling a vehicle windshield washer fluid reservoir as defined by claim 1, wherein the means for authorizing use comprises an automotive refueling station transaction system.

7. The windshield washer fluid dispenser for selectively filling a vehicle windshield washer fluid reservoir as defined by claim 1, wherein the means for authorizing use comprises a credit card scanner.

8. The windshield washer fluid dispenser for selectively filling a vehicle windshield washer fluid reservoir as defined by claim 1, wherein the means for authorizing use comprises a means of verifying identification.

9. The windshield washer fluid dispenser for selectively filling a vehicle windshield washer fluid reservoir as defined by claim 1, wherein the means for authorizing use is located outside the interior space.

10. The windshield washer fluid dispenser for selectively filling a vehicle windshield washer fluid reservoir as defined by claim 1, wherein the power source is a standard 110 volts alternating current.

11. The windshield washer fluid dispenser for selectively filling a vehicle windshield washer fluid reservoir as defined by claim 1, wherein the power source is one or more from the group consisting of batteries, photovoltaic cells and fuel cells.

12. The windshield washer fluid dispenser for selectively filling a vehicle windshield washer fluid reservoir as defined by claim 1, further comprising a display cap and one or more display surfaces.

13. The windshield washer fluid dispenser for selectively filling a vehicle windshield washer fluid reservoir as defined by claim 1, further comprising a display cap, one or more display surfaces and a light source.

14. The windshield washer fluid dispenser for selectively filling a vehicle windshield washer fluid reservoir as defined by claim 1, further comprising a discharge line reel.

15. The windshield washer fluid dispenser for selectively filling a vehicle windshield washer fluid reservoir as defined by claim 1, further comprising an intake line check valve to prevent accidental leakage of windshield washer fluid.

16. The windshield washer fluid dispenser for selectively filling a vehicle windshield washer fluid reservoir as defined by claim 1, further comprising a container line check valve configured with the first container line.

17. The windshield washer fluid dispenser for selectively filling a vehicle windshield washer fluid reservoir as defined by claim 1, further comprising a flow restrictor.

18. The windshield washer fluid dispenser for selectively filling a vehicle windshield washer fluid reservoir as defined by claim 1, further comprising a totalizer configured to monitor the total volume of windshield washer fluid discharged from the discharge line.

19. The windshield washer fluid dispenser for selectively filling a vehicle windshield washer fluid reservoir as defined by claim 1, further comprising a coin counter configured to monitor the total currency or coins collected by the means for authorizing use.

20. A process for refilling a windshield washer fluid dispenser, comprising the steps of:
providing a windshield washer fluid dispenser as defined by claim 1;
gaining access to the interior space of the windshield washer fluid dispenser;
acquiring the intake line, connecting one end of the intake line to the input valve and placing the other end of the intake line into a bulk external container with a quantity of fluid to be transferred to the fluid container;
configuring the fluid pump assembly into a "REFILL" configuration thereby capable of transferring the quantity of fluid into the intake line, through the input valve, through the pump, through the output valve, through the second container line and into the fluid container; and
switching the pump switch to a "REFILL" position thereby engaging the pump, causing a desired volume of the quantity of fluid to flow into the fluid container.

21. A process for discharging windshield washer fluid directly to a vehicle windshield washer fluid reservoir, comprising the steps of:
providing a windshield washer fluid dispenser and a vehicle windshield washer fluid reservoir as defined by claim 1;
obtaining authorization to use the windshield washer fluid dispenser;
extending the discharge line from the windshield washer fluid dispenser to the vehicle windshield washer fluid reservoir; and
selectively utilizing the discharge valve thereby permitting flow of the windshield washer fluid from the windshield washer fluid dispenser into the vehicle windshield washer fluid reservoir.

22. The process for discharging windshield washer fluid directly to a vehicle windshield washer fluid reservoir as defined by claim 21, wherein obtaining authorization to use the windshield washer fluid dispenser comprises inserting coins into a coin acceptor disposed on the windshield washer fluid dispenser.

23. The process for discharging windshield washer fluid directly to a vehicle windshield washer fluid reservoir as defined by claim 21, wherein obtaining authorization to use the windshield washer fluid dispenser comprises scanning a credit card into the means of authorizing use of the windshield washer fluid dispenser.

24. A windshield washer fluid dispenser for selectively filling a vehicle windshield washer fluid reservoir, comprising:
a base housing with an interior space defined by the base housing;
a display cap with one or more display surfaces;
an access door providing access to the interior space of the base housing;
a power source capable of rendering electric current to operate the apparatus;
a fluid container within the interior space, the fluid container capable of containing a supply of windshield washer fluid;
a supply of windshield washer fluid contained within the fluid container, wherein the supply of windshield washer fluid has a flashpoint above one hundred degrees Fahrenheit;
an intake line environmentally communicating with an input valve;
a discharge line environmentally communicating with an output valve leading to a discharge end thereof, the discharge line being of sufficient length to extend from the windshield washer fluid dispenser to the vehicle windshield washer fluid reservoir;
a discharge valve in the discharge line adjacent to the discharge end, the discharge valve being selectively operable between an open discharge condition and a closed retention condition;
a flow restrictor environmentally communicating with the discharge line;
a first container line environmentally communicating with the input valve and the fluid container;
a second container line environmentally communicating with the output valve and the fluid container;
an intake line check valve to prevent accidental leakage of windshield washer fluid;
a container line check valve configured upon the second container line;
a fluid pump assembly, configurable to refill the contents of the fluid container or discharge the contents of the fluid container, further comprising the input valve, the first container line, the output valve, the second container line and a pump, wherein the pump environmentally communicates with the input valve and the output valve;
a tank empty indicator disposed upon the access door;
a tank empty float switch disposed within the fluid container communicating with the tank empty indicator;
a totalizer configured to monitor the total volume of windshield washer fluid discharged from the discharge line; and
a means for authorizing use of the windshield washer fluid dispenser.

25. The windshield washer fluid dispenser for selectively filling a vehicle windshield washer fluid reservoir as defined by claim 24, wherein the means for authorizing use comprises a device accepting coins or bills.

26. The windshield washer fluid dispenser for selectively filling a vehicle windshield washer fluid reservoir as defined by claim 24, wherein the means for authorizing use comprises an automotive refueling station transaction system.

27. The windshield washer fluid dispenser for selectively filling a vehicle windshield washer fluid reservoir as defined by claim 24, wherein the means for authorizing use comprises a credit card scanner.

28. The windshield washer fluid dispenser for selectively filling a vehicle windshield washer fluid reservoir as defined by claim 24, wherein the means for authorizing use comprises a means of verifying identification.

29. The windshield washer fluid dispenser for selectively filling a vehicle windshield washer fluid reservoir as defined by claim 24, wherein the means for authorizing use is located outside the interior space.

30. The windshield washer fluid dispenser for selectively filling a vehicle windshield washer fluid reservoir as defined by claim 24, wherein the power source is one or more from the group consisting of batteries, photovoltaic cells and fuel cells.

31. The windshield washer fluid dispenser for selectively filling a vehicle windshield washer fluid reservoir as defined by claim 24, further comprising a coin counter configured to monitor the total currency or coins collected by the means for authorizing use.

32. A process for refilling a windshield washer fluid dispenser, comprising the steps of:
    providing a windshield washer fluid dispenser as defined by claim 24;
    gaining access to the interior space of the windshield washer fluid dispenser;
    acquiring the intake line, connecting one end of the intake line to the input valve and placing the other end of the intake line into a bulk external container with a quantity of fluid to be transferred to the fluid container;
    configuring the fluid pump assembly into a "REFILL" configuration thereby capable of transferring the quantity of fluid into the intake line, through the input valve, through the pump, through the output valve, through the second container line and into the fluid container; and
    switching the pump switch to a "REFILL" position thereby engaging the pump, causing a desired volume of the quantity of fluid to flow into the fluid container.

33. A process for discharging windshield washer fluid directly to a vehicle windshield washer fluid reservoir, comprising the steps of:
    providing a windshield washer fluid dispenser and vehicle windshield washer fluid reservoir as defined by claim 25;
    obtaining authorization to use the windshield washer fluid dispenser;
    extending the discharge line from the windshield washer fluid dispenser to the vehicle windshield washer fluid reservoir; and
    selectively utilizing the discharge valve thereby permitting flow of the windshield washer fluid from the windshield washer fluid dispenser into the vehicle windshield washer fluid reservoir.

34. The process for discharging windshield washer fluid directly to a vehicle windshield washer fluid reservoir as defined by claim 33, wherein obtaining authorization to use the windshield washer fluid dispenser comprises inserting coins into a coin acceptor disposed on the windshield washer fluid dispenser.

35. The process for discharging windshield washer fluid directly to a vehicle windshield washer fluid reservoir as defined by claim 33, wherein obtaining authorization to use the windshield washer fluid dispenser comprises scanning a credit card into the means of authorizing use of the windshield washer fluid dispenser.

36. A windshield washer fluid dispenser for selectively filling a vehicle windshield washer fluid reservoir, comprising:
    a base housing with an interior space defined by the base housing;
    a roof disposed on the base housing;
    a display cap with one or more display surfaces and a light source;
    an access door providing access to the interior space of the base housing;
    a power source capable of rendering electric current to operate the apparatus;
    a fluid container within the interior space, the fluid container capable of containing a supply of windshield washer fluid;
    a supply of windshield washer fluid contained within the fluid container;
    an intake line environmentally communicating with an input valve;
    a discharge line environmentally communicating with an output valve leading to a discharge end thereof, the discharge line being of sufficient length to extend from the windshield washer fluid dispenser to the vehicle windshield washer fluid reservoir;
    a discharge valve in the discharge line adjacent to the discharge end, the discharge valve being selectively operable between an open discharge condition and a closed retention condition;
    a flow restrictor environmentally communicating with the discharge line;
    a first container line environmentally communicating with the input valve and the fluid container;
    a second container line environmentally communicating with the output valve and the fluid container;
    an intake line check valve to prevent accidental leakage of windshield washer fluid;
    a container line check valve configured upon the second container line;
    a fluid pump assembly, configurable to refill the contents of the fluid container or discharge the contents of the fluid container, further comprising the input valve, the first container line, the output valve, the second container line and a pump, wherein the pump environmentally communicates with the input valve and the output valve;
    a control panel disposed within the interior space providing a power indicator and one or more power outlets;
    a tank empty indicator disposed upon the access door;
    a tank full float switch disposed within the fluid container communicating with a tank full indicator;
    a tank empty float switch disposed within the fluid container communicating with the tank empty indicator;
    a totalizer configured to monitor the total volume of windshield washer fluid discharged from the discharge line;
    a means for authorizing use of the windshield washer fluid dispenser; and
    a coin counter configured to monitor the total currency or coins collected by the means for authorizing use.

37. The windshield washer fluid dispenser for selectively filling a vehicle windshield washer fluid reservoir as defined by claim 36, wherein the fluid container is removable from the base housing.

38. The windshield washer fluid dispenser for selectively filling a vehicle windshield washer fluid reservoir as defined by claim 36, wherein the means for authorizing use comprises a device accepting coins or bills.

39. The windshield washer fluid dispenser for selectively filling a vehicle windshield washer fluid reservoir as defined by claim 36, wherein the means for authorizing use comprises an automotive refueling station transaction system.

40. The windshield washer fluid dispenser for selectively filling a vehicle windshield washer fluid reservoir as defined by claim 36, wherein the means for authorizing use comprises a debit card or credit card scanner.

41. The windshield washer fluid dispenser for selectively filling a vehicle windshield washer fluid reservoir as defined by claim 36, wherein the means for authorizing use comprises a means of verifying identification.

42. The windshield washer fluid dispenser for selectively filling a vehicle windshield washer fluid reservoir as defined by claim 36, wherein the means for authorizing use is located outside the interior space.

43. The windshield washer fluid dispenser for selectively filling a vehicle windshield washer fluid reservoir as defined by claim 36, wherein the power source is a standard electrical current of 110 volts alternating current.

44. The windshield washer fluid dispenser for selectively filling a vehicle windshield washer fluid reservoir as defined by claim 36, wherein the power source is one or more from the group consisting of batteries, photovoltaic cells and fuel cells.

45. The windshield washer fluid dispenser for selectively filling a vehicle windshield washer fluid reservoir as defined by claim 36, wherein the flow constrictor is one and a half gallons per minute.

46. A process for refilling a windshield washer fluid dispenser, comprising the steps of:

providing a windshield washer fluid dispenser as defined by claim 36;

gaining access to the interior space of the windshield washer fluid dispenser;

acquiring the intake line, connecting one end of the intake line to the input valve and placing the other end of the intake line into a bulk external container with a quantity of fluid to be transferred to the fluid container;

configuring the fluid pump assembly into a "REFILL" configuration thereby capable of transferring the quantity of fluid into the intake line, through the input valve, through the pump, through the output valve, through the second container line and into the fluid container; and switching the pump switch to a "REFILL" position thereby engaging the pump, causing a desired volume of the quantity of fluid to flow into the fluid container.

47. A process for discharging windshield washer fluid directly to a vehicle windshield washer fluid reservoir, comprising the steps of:

providing a windshield washer fluid dispenser and vehicle windshield washer fluid reservoir as defined by claim 36;

obtaining authorization to use the windshield washer fluid dispenser;

extending the discharge line from the windshield washer fluid dispenser to the vehicle windshield washer fluid reservoir; and selectively utilizing the discharge valve thereby permitting flow of the windshield washer fluid from the windshield washer fluid dispenser into the vehicle windshield washer fluid reservoir.

48. The process for discharging windshield washer fluid directly to a vehicle windshield washer fluid reservoir as defined by claim 47, wherein obtaining authorization to use the windshield washer fluid dispenser comprises inserting coins into a coin acceptor disposed on the windshield washer fluid dispenser.

49. The process for discharging windshield washer fluid directly to a vehicle windshield washer fluid reservoir as defined by claim 47, wherein obtaining authorization to use the windshield washer fluid dispenser comprises scanning a credit card into the means of authorizing use of the windshield washer fluid dispenser.

* * * * *